United States Patent [19]
Bhansali et al.

[11] Patent Number: 6,006,239
[45] Date of Patent: Dec. 21, 1999

[54] METHOD AND SYSTEM FOR ALLOWING MULTIPLE USERS TO SIMULTANEOUSLY EDIT A SPREADSHEET

[75] Inventors: Anil Bhansali, Newcastle; Rohit V. Wad; Eric Michelman, both of Seattle, all of Wash.; Wyatt T. Riley, Las Vegas, Nev.

[73] Assignee: Microsoft Corporation, Redmond, Wash.

[21] Appl. No.: 08/617,973

[22] Filed: Mar. 15, 1996

[51] Int. Cl.[6] .................................................. G06F 17/30
[52] U.S. Cl. ............................... 707/201; 707/104
[58] Field of Search .................... 395/608, 617, 395/619; 707/201, 202, 203, 8, 104, 10; 705/2

[56] References Cited

U.S. PATENT DOCUMENTS

| | | | |
|---|---|---|---|
| 5,181,162 | 1/1993 | Smith et al. | 707/530 |
| 5,255,356 | 10/1993 | Michelman et al. | 707/504 |
| 5,319,777 | 6/1994 | Perez | 707/10 |
| 5,581,753 | 12/1996 | Terry et al. | 707/201 |
| 5,600,834 | 2/1997 | Howard | 707/201 |
| 5,799,305 | 8/1998 | Bortvedt et al. | 707/10 |
| 5,826,237 | 10/1998 | Macrae et al. | 705/2 |
| 5,893,077 | 4/1999 | Griffin | 705/34 |

*Primary Examiner*—Paul R. Lintz
*Assistant Examiner*—Charles L. Rones
*Attorney, Agent, or Firm*—Jones & Askew, LLP

[57] ABSTRACT

In association with a computer system, a method and system for allowing multiple users to simultaneously edit a spreadsheet. Multiple users access a spreadsheet stored in a disk file and make independent changes to the spreadsheet. Changes are stored in respective memory change logs on each user's computer. When a user performs a save operation, the contents of the memory change log are appended to a disk change log in the disk file. When each user performs a save operation, each user's changes, as maintained in each respective memory change log, are appended to the disk change log. Conflicting changes that cannot simultaneously exist in the spreadsheet in the disk file are identified and resolved by allowing the user to select the winning action or automatically selecting the most recent action as the winning action. Losing actions in the memory change log are deleted and losing actions in the disk change log are effectively canceled by applying an inverse action to the losing action. Each inverse action is stored in a disk undo log stored in the disk file.

28 Claims, 9 Drawing Sheets

USER 2
MEMORY CHANGE LOG 2

- USER 2
- SESSION ID = 1
- DATE
- TIME

| CELL | CHANGE |
|------|--------|
| A1 | DELETE ROW: |
| A2 | "25" |
|  | MOVE TO B2 |

FIG.6a

DISK CHANGE LOG

•
•
•

- USER 2
- SESSION ID = 1
- DATE
- TIME

| CELL | CHANGE |
|------|--------|
| A1 | DELETE ROW: |
| A2 | "25" |
|  | MOVE TO B2 |

METHOD AND SYSTEM FOR ALLOWING MULTIPLE USERS TO SIMULTANEOUSLY EDIT A SPREADSHEET

TECHNICAL FIELD

The present invention relates generally to the editing of a spreadsheet on a computer system and, more specifically, to a system and method for allowing multiple users to simultaneously edit the same spreadsheet.

BACKGROUND OF THE INVENTION

Spreadsheet programs are widely-used application programs that run on personal computers. Spreadsheet programs are commonly used for budgets, forecasting, and other finance-related tasks. In a spreadsheet program, data and formulas are entered in ledger-like forms for analysis, tracking, planning, or evaluations of the impacts of real or proposed changes on data.

Spreadsheet programs use rows and columns of cells for the display of data. Depending on the program, a single spreadsheet may contain thousands of cells. Some spreadsheet programs can also link one spreadsheet to another spreadsheet that contains related information and can update data in linked spreadsheets automatically. Spreadsheet programs may also include macro facilities, and some can be used for creating and sorting databases. For printed output, spreadsheet programs usually provide graphing capabilities and a variety of formatting options for both printed pages and text, numeric values, and captions and legends in graphs.

Each row and column in a spreadsheet is unique, so each cell is uniquely identified. Typically, each column is identified by a letter, and each row is identified by a number. Thus, the cell located at the intersection of column A and row 1 is identified as cell A1. Each cell is displayed as a rectangular space that can hold text, numerical data, or a formula that uses parameters, which may comprise data in other cells, to calculate a desired result.

As with other application programs, a computer user may add, delete, or change data within each cell of the spreadsheet. Also, spreadsheet programs allow users to alter the format and layout of the spreadsheet by, among other things, adding and deleting rows, columns, or groups of cells within the spreadsheet. When a modified spreadsheet is saved by the user, a new spreadsheet is created that includes all data and layout modifications. When saved, the "image" of the new spreadsheet, i.e., a copy of the modified spreadsheet, is stored in a memory storage device on the user's computer system.

In today's business environment, multiple computers are commonly linked via a network. A network is a group of computers and associated devices that are interconnected via communication facilities. A network can involve permanent connections, such as cables, or temporary connections made through telephone or other communications links. A network can be as small as a local area network (LAN) consisting of a few computers, printers, and other devices, or it can consist of many small and large computers distributed over a vast geographic area. Computer networks exist to provide computer users with the means of communicating and transferring information electronically. Some types of communications are simple user-to-user messages. Other types of computer communications can involve several computers and the sharing of workloads or cooperative efforts in performing a task.

Thus, a network allows users of other computers to access a spreadsheet that is stored in a memory storage device of a server, i.e., a particular computer on a local area network that makes resources available to other computers on the network. The computer on which the spreadsheet is permanently stored is called the server and each computer used to access the spreadsheet provided by the server is called a client.

Although multiple users can each access the spreadsheet on a respective client computer, no capability currently exists to allow multiple users to simultaneously edit the spreadsheet such that the modifications made by a user are merged with the modifications made by each of the other users. To illustrate, consider two users of computers linked to a network. User 1 and user 2 simultaneously access the spreadsheet stored on the server. Thus, a copy of the spreadsheet is loaded into each user's computer such that each user can make independent changes to the spreadsheet. For the purposes of this example, assume the old spreadsheet, i.e., the spreadsheet stored on the server that was accessed by each user, includes the number "5" in cell A1.

In the copy of the spreadsheet on user 1's computer, user 1 changes the contents of cell A1 from "5" to "10". User 1 then saves the spreadsheet containing the new data to the server. User 1's modified spreadsheet may also be saved on the user's computer as well as on the server.

User 2 simultaneously accesses the old spreadsheet and adds the formula "A1+10" in cell A2. Therefore, user 2 has created a formula in cell A2 that user 2 believes will yield the numerical result "15" because the old spreadsheet to which user 2 has access contains the numeral "5" in cell A1. User 2 then saves the changes to the modified spreadsheet to the server and, if desired, on user 2's computer.

Thus, when saved to the server, the copy of the spreadsheet as modified by user 2 overwrites the spreadsheet as modified by user 1. The new spreadsheet stored on the server, after both users have made their changes, consists of user 2's spreadsheet because user 2 was the last user to save the spreadsheet to the server. Therefore, the modified data entered in cell A1 by user 1 is destroyed and is not incorporated into the spreadsheet of user 2. Thus, the result of user 2's formula in cell A2 should be "20", because the contents of cell A1 were changed to "10" by user 1, but the actual result of the formula in the new spreadsheet is "15".

Therefore, it should be understood that although editing and modification of a spreadsheet by multiple users is currently permitted, the capability to combine and incorporate of the modifications made by each user into a new spreadsheet is not provided.

Several current spreadsheet application programs provide "versioning" capabilities in which copies of old spreadsheets, or portions of old spreadsheets, are saved and can be recalled. Therefore, versioning allows a user to access a spreadsheet that was saved at various points in time. However, spreadsheet application programs that provide versioning capabilities do not provide for the incorporation, or merging, of multiple user's changes into a single spreadsheet.

Current programs also do not provide for resolving conflicting changes made by users. Conflicting changes are those changes that cannot exist on the same spreadsheet at the same time. For example, when a change made by user 1 is to add data to a cell in row 2 and a change made by user 2 is to delete row 2, it is impossible for the two changes to exist in the same spreadsheet simultaneously. Current spreadsheet application programs do not provide the capability for concurrent editing of a spreadsheet and, therefore, necessarily do not provide for the resolution of conflicting changes made by multiple users.

SUMMARY OF THE INVENTION

The present invention is directed to a method and system for allowing multiple users to simultaneously edit a spreadsheet. Multiple users access a spreadsheet stored in a disk file and make independent changes to the spreadsheet. These changes are stored in respective memory change logs on each user's computer. When a user performs a save operation, the contents of the memory change log are appended to a disk change log in the disk file.

The present invention determines whether multiple users have made conflicting changes to the spreadsheet, i.e., changes that cannot simultaneously exist in the same spreadsheet. If conflicting changes exist, the present invention resolves the conflict by either allowing the user to select the winning action or automatically selecting the most recent action as the winning action. If the losing action is located in the user's memory change log, the losing action is deleted from the memory change log. If the losing action is located in the disk change log, the losing action is effectively canceled by applying an inverse action to the losing action. Each inverse action is stored in a disk undo log on the user's computer that is later appended to the disk change log when the user performs a save operation.

Therefore, when a user makes changes to a spreadsheet and performs a save operation to the disk file, the disk file that contains the previously-existing disk change log is appended with the disk undo log followed by the user's memory change log. Subsequently, when the contents of the new disk change log are read sequentially, any losing actions in the previously-existing disk change log that conflict with changes in the memory change log are followed by the corresponding undo actions in the disk undo log before the winning action in the memory change log is read. This prevents a losing action in the disk change log from being followed by the corresponding winning action in the memory change log without an intervening undo action.

DETAILED DESCRIPTION OF THE PREFERRED EMBODIMENT

Turning next to the figures, the preferred embodiment will now be described in detail. The present invention is directed to a method and system for allowing multiple users to simultaneously edit a spreadsheet. Via a network, multiple users access a spreadsheet stored in a disk file and make independent changes. These changes are stored in respective memory change logs on each user's computer. When a user performs a save operation, the contents of the memory change log are appended to a disk change log in the disk file. When each user performs a save operation, each user's changes, as maintained in each respective memory change log, are appended to the disk change log.

The present invention determines whether multiple users have made conflicting changes, i.e., changes that cannot simultaneously exist in the spreadsheet in the disk file. If conflicting changes exists, the present invention resolves the conflict by either allowing the user to select the winning action or automatically selecting the most recent action as the winning action.

Although the preferred embodiment will be generally described in the context of an application program and an operating system running on an IBM-compatible personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

Turning first to the nomenclature of the specification, the detailed description which follows is represented largely in terms of processes and symbolic representations of operations by conventional computer components, including a local central processing unit (CPU), local memory storage devices for the local CPU, connected display devices, and input devices. Furthermore, these processes and operations may utilize conventional computer components in a heterogeneous distributed computing environment, including remote file servers, remote compute servers, and remote memory storage devices. Each of these conventional distributed computing components is accessible to the local CPU by a communications network. Those skilled in the art will recognize that such a communications network may be a local area network or may be a geographically dispersed wide area network, such as the Internet or an enterprise-wide computer network.

The processes and operations performed by the computer include the manipulation of data bits by a local CPU or remote server and the maintenance of these bits within data structures resident in one or more of the local or remote memory storage devices. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, works, values, elements, symbols, characters, terms, numbers, points, records, objects, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, altering, etc. which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communications network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Furthermore, it should be understood that there is a distinction between the methods, steps, or operations completed by a computer and the method of computation itself. The present invention does not involve a method of computation. Instead, the present invention relates to methods, processes, steps, or operations for a computer and the processing of electrical or other physical signals to generate desired physical signals and to display results and interactions.

Referring now to the drawings, in which like numerals represent like elements throughout the several figures, the present invention and the preferred operating environment will be described.

Figure 1:
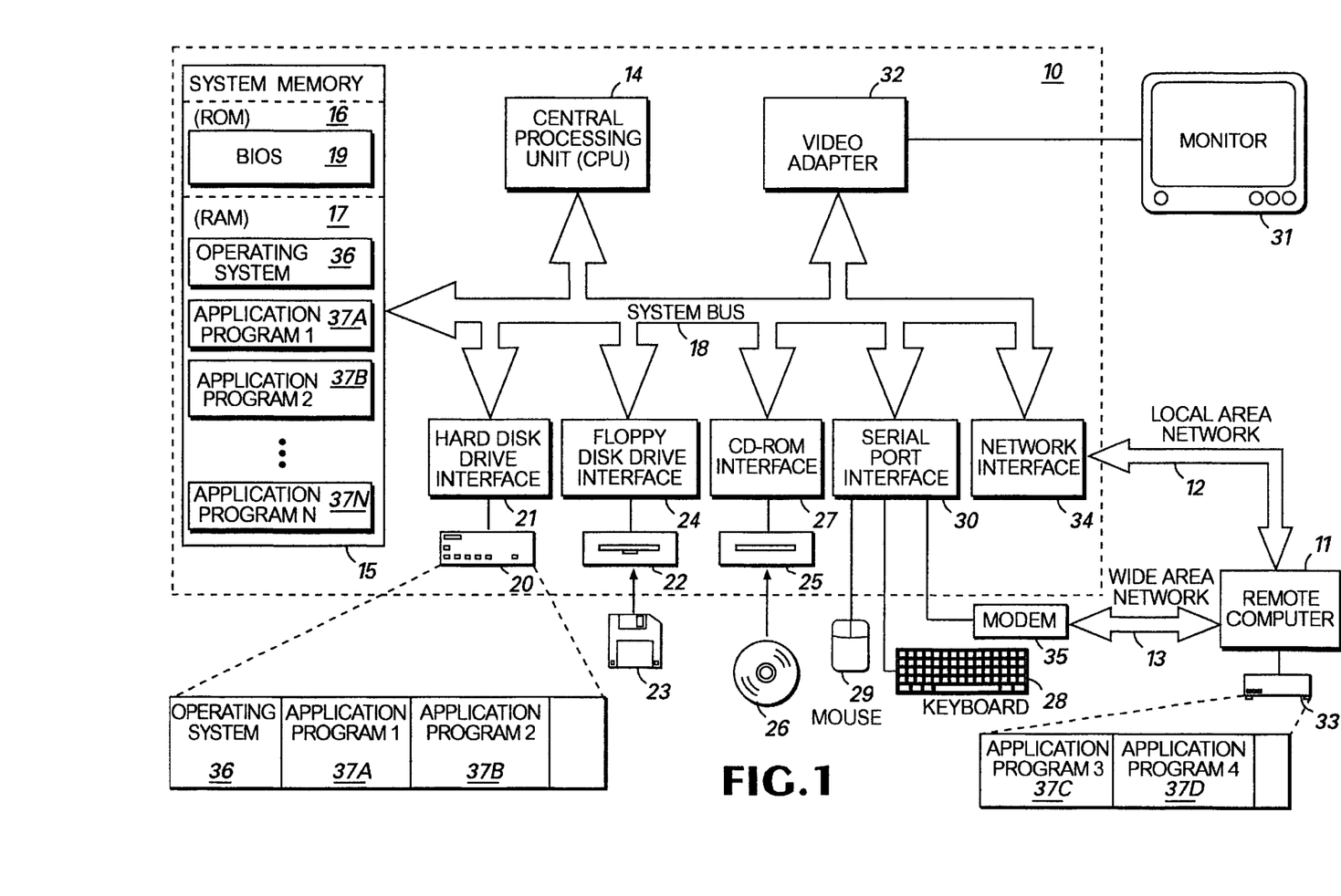
FIG. 1 is a block diagram of a computer system on which the present invention is implemented.

FIG. 1 illustrates various aspects of the preferred computing environment in which the present invention is designed to operate. Those skilled in the art will immediately appreciate that FIG. 1 and the associated discussion are intended to provide a brief general description of the preferred computer hardware and program modules and that additional information is readily available in the appropriate programming manuals, user's guides, and similar publications.

FIG. 1 illustrates a conventional computer 10 that may be suitable for implementing the present invention. As shown in FIG. 1, the computer 10 is in a network environment with logical connections to a remote computer 11. The logical connections between the computer 10 and the remote computer 11 are represented by a local area network 12 and a wide area network 13. Those of ordinary skill in the art will recognize that in this client/server configuration, the remote computer 11 may function as a file server or computer server.

The computer 10 includes a central processing unit (CPU) 14, such as the 80486 or "PENTIUM" microprocessor manufactured by Intel Corporation of Santa Clara, Calif. The computer also includes system memory 15, including read only memory (ROM) 16 and random access memory (RAM) 17, connected to the CPU by the system bus 18. The basic input/output system (BIOS) 19 for the computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or pointing device, such as a mouse 29, which are connected to the system bus 18 via a serial port interface 30. Other types of pointing devices may include track pads, track balls, and other devices suitable for positioning a cursor on a computer monitor 31. The monitor 31 or other kind of display device is connected to the system bus 18 via a video adapter 32.

The remote computer 11 in the network environment shown in FIG. 1 is connected to a remote memory storage device 33. This remote memory storage device 33 is typically a large capacity device such as a hard disk drive, CD-ROM drive, magneto-optical drive, or the like. The computer 10 is connected to the remote computer 11 by a network interface 34, which is used to communicate over the local area network 12.

As shown in FIG. 1, the computer 10 may also be connected to the remote computer 11 by a modem 35, which is used to communicate over the wide area network 13, such as the Internet. The modem 35 is connected to the system bus 18 via the serial port interface 30. Although illustrated in FIG. 1 as external to the computer 10, those of ordinary skill in the art will recognize that a modem 35 may also be internal to the computer 10, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such components and the interconnection between them are well known. Accordingly, additional details concerning the internal construction of the computer 10 need not be disclosed in connection with the present invention. It should also be understood that the components and operation of computer 10, as described in FIG. 1, may also be provided within remote computer 11.

Those skilled in the art will understand that program modules such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs.

Figure 2:
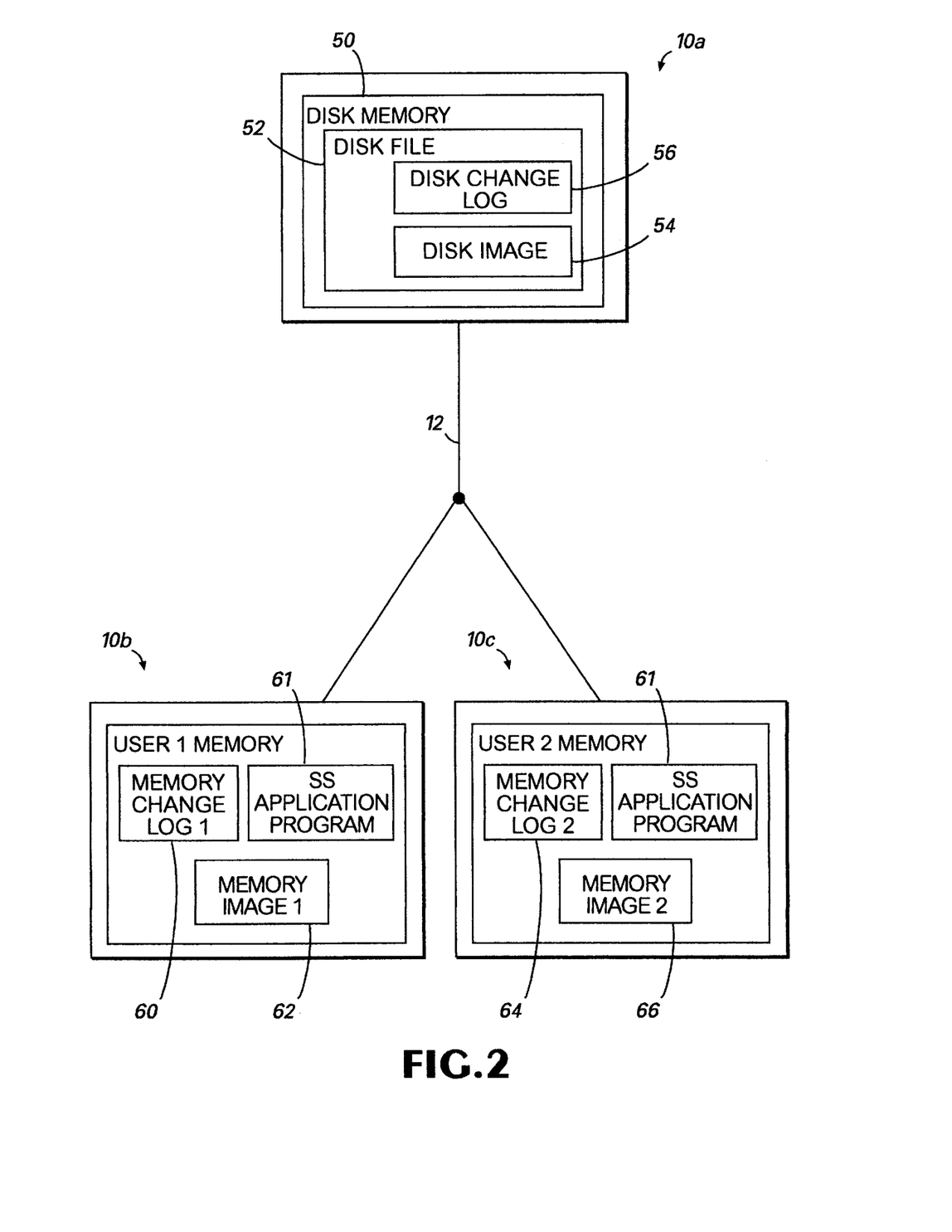
FIG. 2 is a block diagram of a networked computer system on which the present invention is implemented.

For the purposes of discussion, the preferred embodiment of the present invention will be described with reference to three computers, shown in FIG. 2 as 10a, 10b, and 10c connected via local area network 12. As described above with reference to FIG. 1, it should be understood that the network may also be a wide area network, such as the Internet. Computer 10a stores the spreadsheet that is accessed by other computers on the network. Thus, computers 10b and 10c can access the spreadsheet stored on computer 10a. It should be understood that although the present invention will be described with reference to three computers, as shown in FIG. 2, the present invention is not limited to merely three computers and may be implemented on any network having any number of computers connected thereto.

For the purposes of this description, computer 10a includes a memory, called the disk memory 50. A disk file 52 is provided within the disk memory 50. A spreadsheet, created using a well known spreadsheet application program such as Excel, manufactured by Microsoft Corporation, assignee of the present invention, is stored in the disk file. The spreadsheet stored in the disk file is called a disk image 54. Also stored in the disk file is a disk change log 56, which will be described more fully below.

Each computer 10b and 10c includes a memory that includes a spreadsheet application program 61. Via the network 12, each computer 10b and 10c can be used by different users to access and edit the spreadsheet stored in the disk file of computer 10a as well as to create new spreadsheets. In this manner, each user of computers 10b and 10c can simultaneously access and edit the spreadsheet stored in computer 10a.

For the purposes of this discussion, the user of computer 10b will be identified as "user 1" and the user of computer 10c will be identified as "user 2".

Stored in the memory of computer 10b is a memory change log, designated "memory change log 1", identified by reference numeral 60 in FIG. 2. Also stored in the memory of computer 10b is a memory image, designated "memory image 1", identified by reference numeral 62. Similarly, a "memory change log 2" 64 and a "memory image 2" 66 are stored in the memory of computer 10c.

Figure 3:
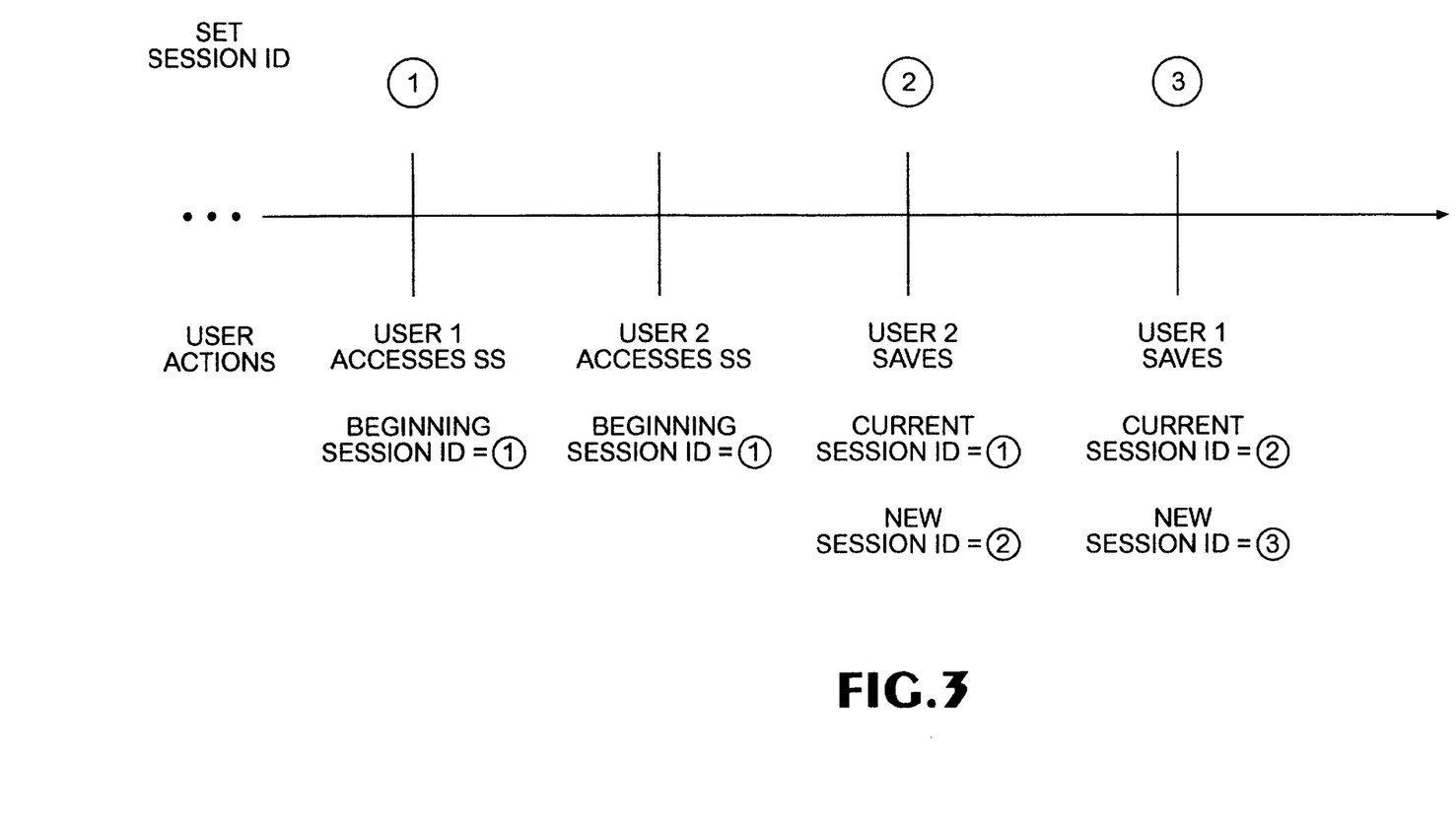
FIG. 3 is a time line showing simultaneous access, user actions, and associated session IDs.

The present invention can best be described with reference to user 1 and user 2 simultaneously accessing and editing the spreadsheet stored in the disk file of computer 10a. A time line of showing such simultaneous access is shown in FIG. 3. Associated with user access of the spreadsheet stored in the disk file is a session identification number, called the "session ID", which is maintained in the memory 50 of the disk file 52. The session ID is changed each time a user performs a save operation to save the spreadsheet to the disk file 52. It should be understood that for purposes of describing the present invention, each session ID is identified and described herein as a sequentially-numbered integer. However, it should be appreciated that the session IDs used in accordance with the present invention are not limited merely to sequentially-numbered integers. Those skilled in the art will understand that each session ID may be any type of number or any other type of identifier such that each session ID is unique.

An example of the use of session IDs is shown in the time line of FIG. 3, which shows that when user 1 accesses the spreadsheet stored on the disk file 52, the session ID is set to "1". This session ID is called the "beginning session ID".

When user 2 subsequently accesses the spreadsheet, the session ID is not changed. However, when user 2 performs a save operation, two events occur. First, the session ID is obtained and is called the "current session ID". Thereafter, the session ID is changed to generate a "new session ID".

In FIG. 3, user 1 performs a save operation subsequent to the time user 2 performs a save operation. When user 1 performs the save operation, the current session ID is obtained from the memory of the disk file. The current session ID is "2". The current session ID is then changed to generate the new session ID "3".

The generation of session IDs allows each user to determine whether another user has performed a save operation since the time that user last accessed the spreadsheet or performed a save operation. Every time a user performs a save operation, the current session ID obtained at the time of the save operation is compared to the beginning session ID. If the session IDs are identical, then it is determined that no intervening save operation has been performed by another user. However, if the session IDs are different, then it signifies that another user has performed an intervening save operation, and the present invention is implemented to combine each user's changes, as will be described more fully below.

Figure 4:
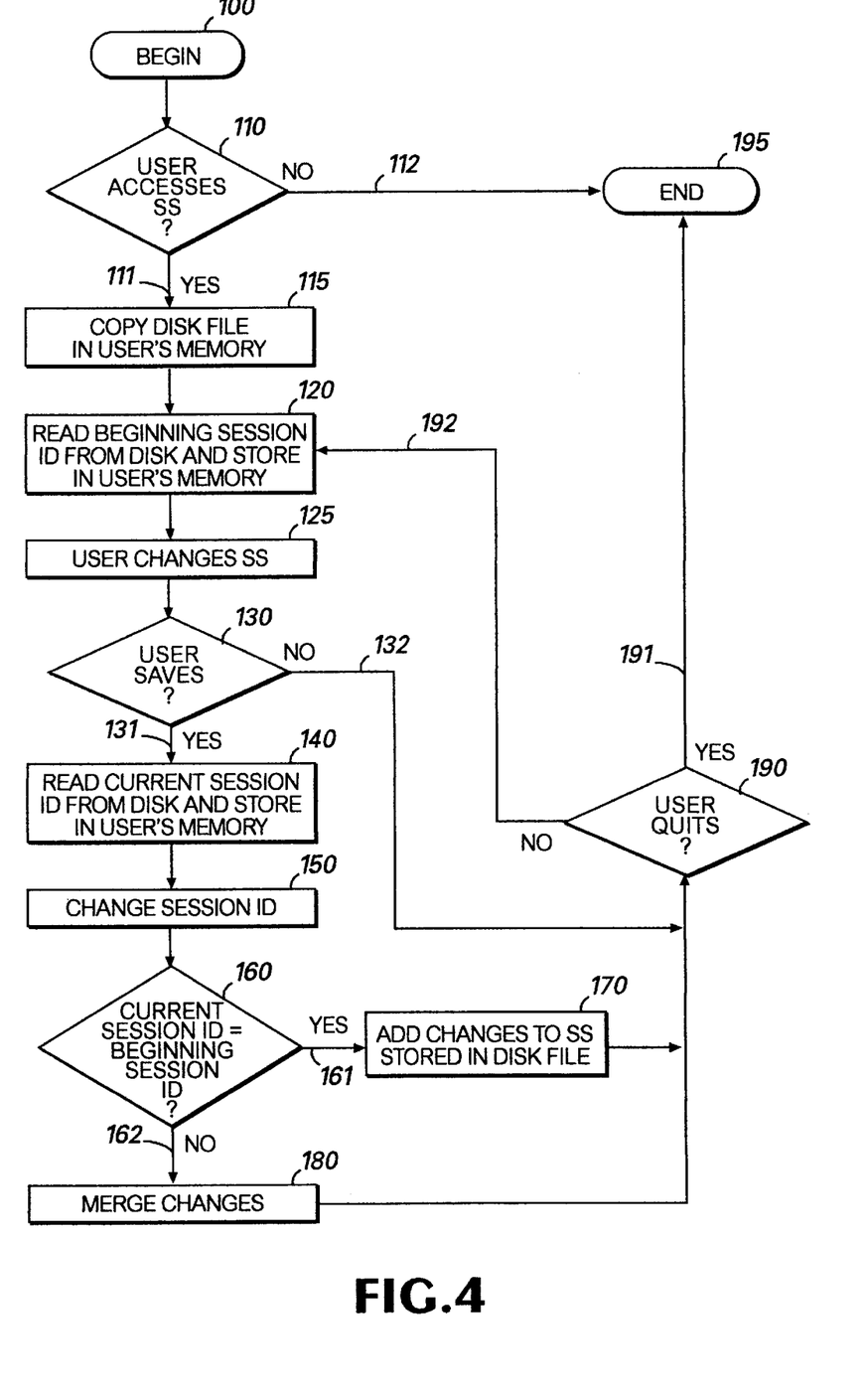
FIG. 4 is a flow chart describing the method of determining whether intervening changes exist.

The method of determining whether another user has made intervening changes to the spreadsheet in the disk file is described in the flow chart of FIG. 4. The method begins at 100. At step 110, it is determined whether the user has accessed the spreadsheet stored in the disk file. If the user has not accessed the spreadsheet, the method follows "no" branch 112, and the method terminates at 195. If it is determined that the user has accessed the spreadsheet stored in the disk file, the method follows "yes" branch 111 to step 115, where the disk file is copied to the memory of the user's computer. At step 120, the beginning session ID is obtained and stored in the memory of the user's computer.

At step 125, the user edits the spreadsheet by making additions, deletions, or other desired changes. It is then determined at step 130 whether the user has performed a save operation. If the user has not performed a save operation, the method follows "no" branch 132 and proceeds to step 190. If the user has performed a save operation, the method follows "yes" branch 131 to step 140.

At step 140, the current session ID is read from the disk file and stored in the memory of the user's computer. At step 150, the current session ID is changed to generate the new session ID. Then, at step 160, the current session ID is compared to the beginning session ID to determine if they are identical. If the current session ID is identical to the beginning session ID, then the method follows "yes" branch 161 to step 170, where the user's changes are added to the spreadsheet stored in the disk file, as will be described more fully below. The method then proceeds to step 190.

If the current session ID is different than the beginning session ID, as determined at step 160, then it is known that another user has made intervening changes to the spreadsheet, and the method follows "no" branch 162 to step 180. At step 180, the user's changes are merged with intervening changes made by the other user, as will be described more fully below. The method then proceeds to step 190.

At step 190, it is determined whether the user has quit the spreadsheet application program. If so, the method follows "yes" branch 191 and the method terminates at 195. If the user has not quit the spreadsheet application program, the method follows "no" branch 192 and returns to step 120.

Figure 5A:
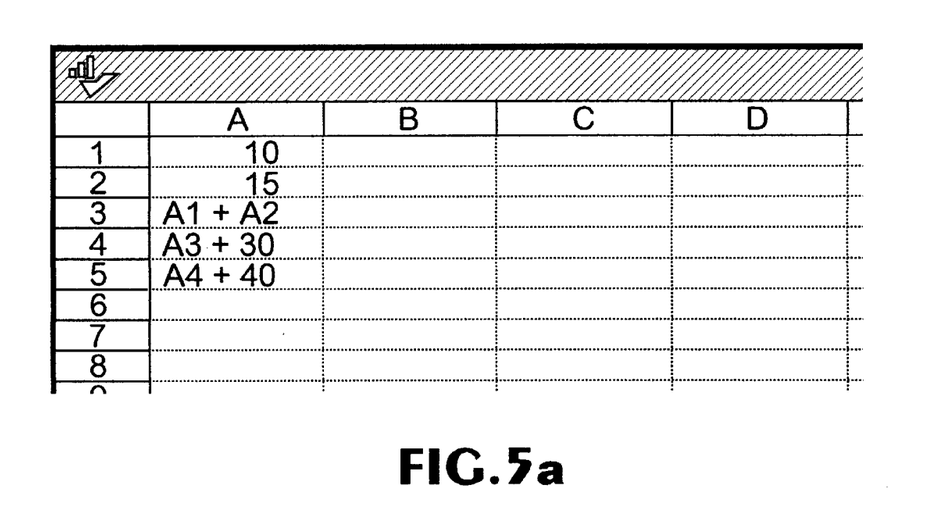
FIGS. 5a–d are examples of spreadsheets showing changes made by multiple users.

An example of a spreadsheet stored in the disk file of computer 10a is shown in FIG. 5a. The spreadsheet includes a plurality of individual cells, in columns identified from left to right in alphabetical order and rows identified from top to bottom in numerical order. The spreadsheet of FIG. 5a is accessed by user 1, who edits the spreadsheet to create the spreadsheet shown in FIG. 5b. Similarly, the spreadsheet of FIG. 5a is simultaneously accessed by user 2 on another computer. User 2's edited spreadsheet is shown in FIG. 5c. For the purposes of this discussion, certain cells in each spreadsheet shown in FIGS. 5b and 5c describe the changes that have been made to the cells. It should be understood that the actual spreadsheet images of these spreadsheets would not include such descriptions. For example, the spreadsheet of FIG. 5b would not include the term "DELETE ROW 4" in cells A4 and B4, and the contents of cell A5 would automatically be reference-adjusted and moved upward to cell A4. Similarly, the spreadsheet of FIG. 5c would not include the term "DELETE ROW 1" in cells A1 and B1 or the term "MOVE TO B2" in cell A2. However, it will be appreciated that the description of the method of the present invention is more easily set forth with reference to the changes made each spreadsheet, as described in FIGS. 5b and 5c.

The changes made by each user are stored in a respective memory change log (MCL) on each users' computer. Each memory change log includes a header that includes the session ID, time, date, and user identifier. Each memory change log also includes each change that has been made to the spreadsheet by the respective user as well as the old data that the change replaces.

Similarly, the disk file includes a disk change log (DCL) and a disk image. The disk image is the current version of the spreadsheet including all combined changes from each user. In the illustrative spreadsheets of FIGS. 5a–c, the disk image is that spreadsheet stored in the disk file, i.e., the spreadsheet shown in FIG. 5a. The disk change log includes a header like the memory change log and also includes each set of changes made to the spreadsheet by each user. Each set of changes made by a user that is stored in the disk change log is called a "change log segment". Thus, the disk change log may include many change log segments identifying changes by numerous users.

When a user accesses the spreadsheet stored in computer 10a, the disk image is copied to the memory of the user's computer. The user then makes changes to the spreadsheet and performs a save operation. If no intervening save operation has taken place, then it is known that no other intervening changes have been made to the spreadsheet by another user. In this case, the changes made by the user, as stored in the memory change log, are copied and appended to the disk change log. Additionally, the memory image of the spreadsheet stored in the user's memory is copied to the disk file and overwrites the disk image. In this manner, the newly changed spreadsheet is saved to the disk file.

However, if intervening changes have been made to the spreadsheet by another user, all changes made by each user must be merged into a single spreadsheet. In the time line of FIG. 3, it should be understood that when user 2 performs a save operation, no intervening changes have been made because the current session ID is the same as the beginning session ID. Therefore, any changes to the spreadsheet made by user 2, stored in user 2's memory change log, are appended to the disk change log and the disk image is overwritten by the memory image.

However, when user 1 makes changes and performs a save operation, it should be understood that intervening changes have been made between the time user 1 accessed the spreadsheet and the time of user 1's save operation. Therefore, user 1's changes must be combined with the intervening changes.

Figure 5B:
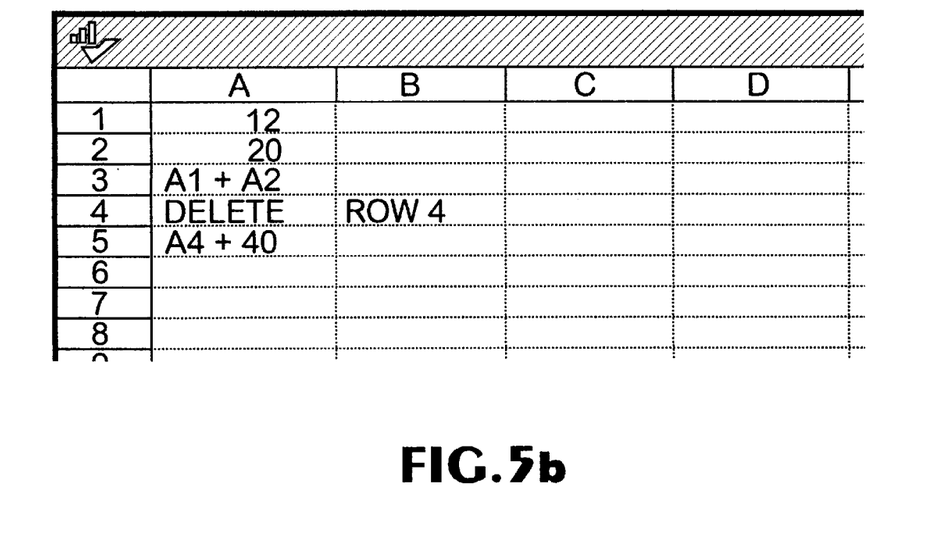
Figure 5C:
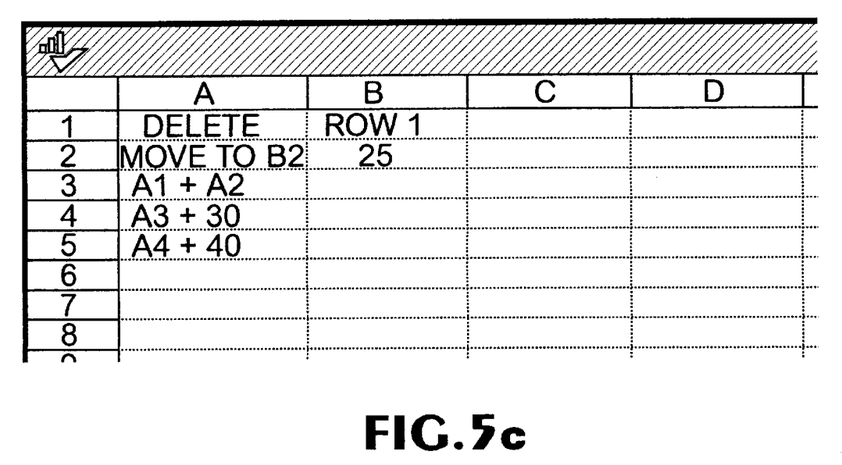
Figure 6A:
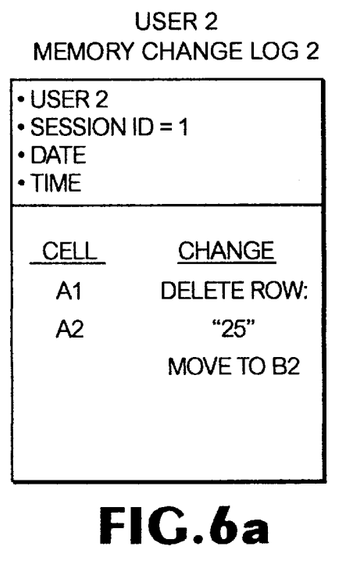
FIGS. 6a–b are examples of memory change log 2 and the disk change log.
Figure 6B:
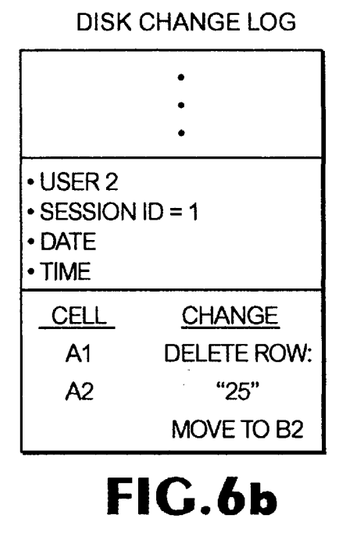

To further illustrate the present invention, FIG. 5c shows the spreadsheet of FIG. 5a including user 2's changes. User 2 has changed the spreadsheet to delete row 1 and, in cell A2, has changed "15" to "25" and moved the data in cell A2 to cell B2. Each change made by user 2 is stored in memory change log 2 in the memory of user 2's computer, as shown in FIG. 6a. As stated above with reference to the time line of FIG. 3, user 2's changes were saved prior to user 1's changes and with no intervening changes from any other user. Therefore, when user 2 performs a save operation, the contents of user 2's memory change log are appended to the disk change log as a change log segment identified with session ID 1. The disk change log is shown in FIG. 6b.

Figures 7A, 7C:
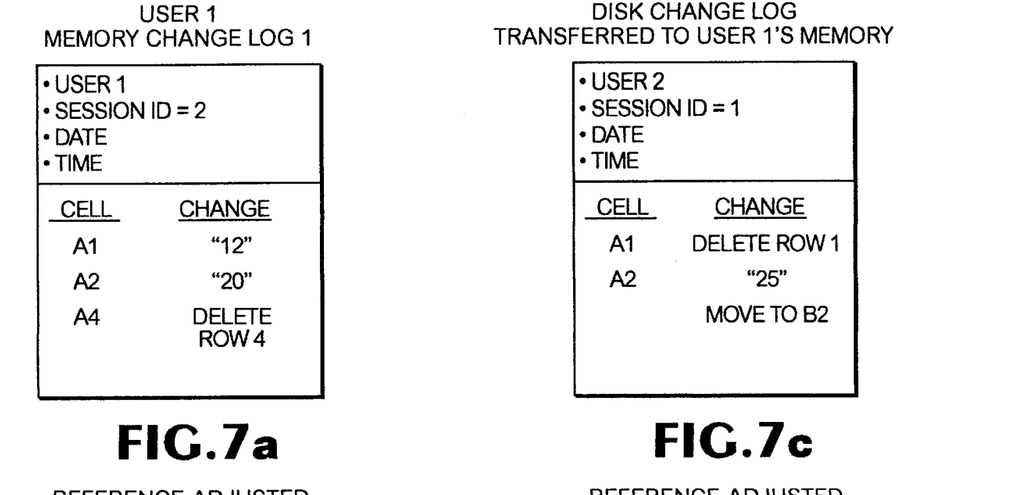
FIGS. 7a–f are examples of memory change log 1, the disk change log, the reference-adjusted memory change log 1 and disk change log, and the disk undo log as used in the merging process.

Similarly, user 1 has changed the spreadsheet as follows: in cell A1 changed "10" to "12", in cell A2 changed "15" to "20", and deleted row 4, as shown in FIG. 5b. Each change made by user 1 is stored in memory change log 1 in the memory of user 1's computer, as shown in FIG. 7a. When user 1 performs a save operation to save the changes to the spreadsheet, the method described in the flow chart of FIG. 4 is used to determine if any intervening changes have been saved to the disk file. As seen in the time line of FIG. 3, user 2 has made intervening changes. Therefore, because intervening changes have been made, user 1's changes must be merged with user 2's changes.

Figures 7B, 7D:
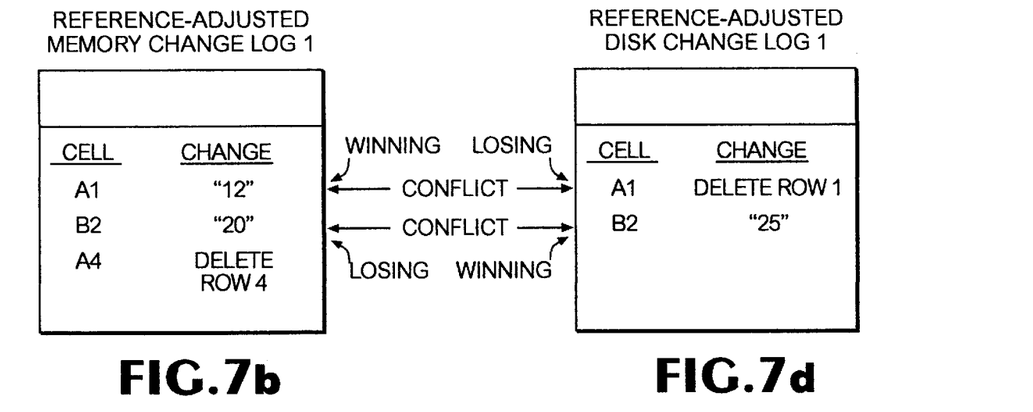
Figure 7E:
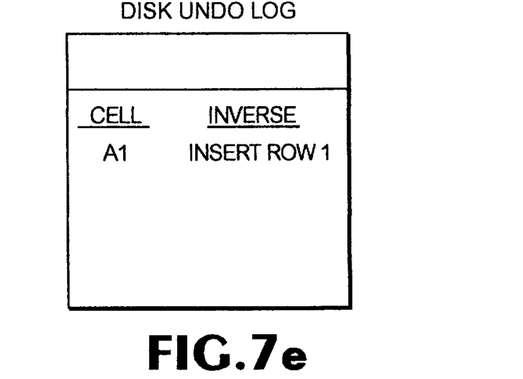
Figure 7F:
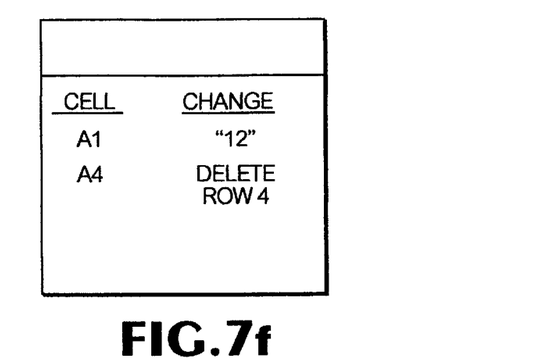
Figure 8:
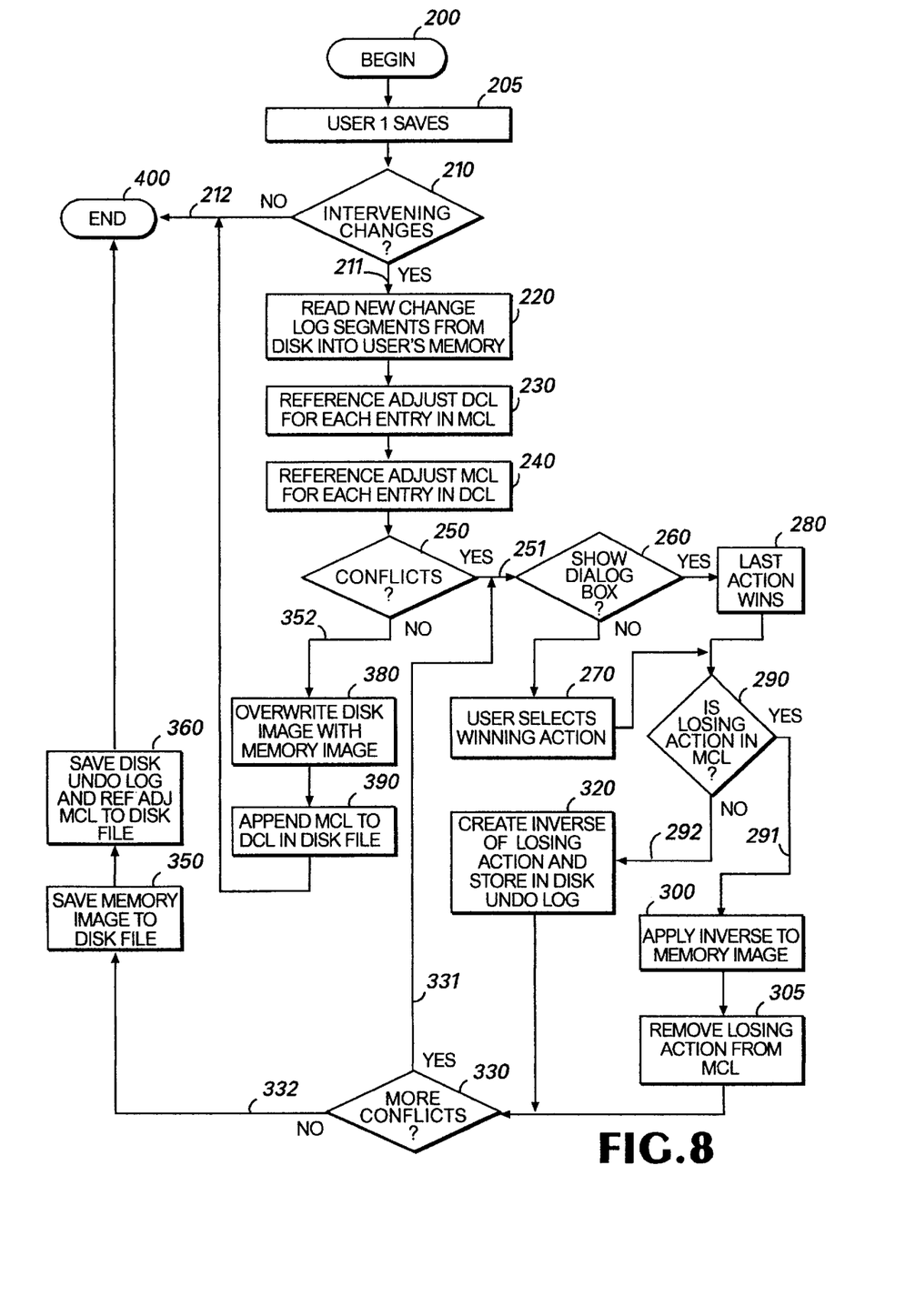
FIG. 8 is a flow chart describing the method of identifying conflicts and merging changes.

The method of merging user 1's changes with user 2's changes is described in the flow chart of FIG. 8, with further reference to the spreadsheets of FIGS. 5a–c and the corresponding change logs as shown in FIGS. 7a–f. The method of merging begins at 200. At step 205, the user performs a save operation to save the changes made to the spreadsheet. At step 210, it is determined whether any intervening changes have been made. If not (e.g. FIG. 3, user 2 saves), the method follows "no" branch 212 and terminates at 400. If there are intervening changes (e.g. FIG. 3, user 1 saves), the method follows "yes" branch 211 to step 220.

At step 220, the change log segments containing user 2's changes that are appended to the disk change log are copied from the disk file into the memory of user 1's computer. The resulting disk change log stored in user 2's memory is shown in FIG. 7c. At step 230, the entries in the disk change log are reference-adjusted according to each change in the memory change log. The resulting reference-adjusted disk change log is shown in FIG. 7d. Similarly, at step 240, each entry in the memory change log is reference-adjusted according to each change in the disk change log. A reference is a pointer to a particular cell in a spreadsheet. When certain operations are performed on a spreadsheet, the references in that spreadsheet must be adjusted. Reference adjusting is well known in spreadsheet application and is the process of adjusting cell addresses that reference other cell address. For example, if cell B1 contains the formula A1+5, and the contents of cell A1 are moved to cell A2, then the formula in cell B1 is automatically reference-adjusted to be A2+5. Therefore, reference adjusting is a method of maintaining correct cell references when cells are moved, added, or deleted. The resulting reference-adjusted memory change log is shown in FIG. 7b.

At step 250, it is determined whether the reference-adjusted memory change log and reference-adjusted disk change log contain any conflicts. It should be understood that the determination of whether any conflicts exist preferably occurs during the reference adjusting described in steps 230 and 240, and not as a distinct operation following such reference adjusting. When reference adjusting cannot be accomplished for a cell, it is determined that a conflict exists for that cell. A conflict occurs when it is impossible for two changes to simultaneously exist in the spreadsheet. A classic example of a conflict is when one user adds data to cell A1 and another user deletes row 1, which includes cell A1. Obviously, both changes cannot exist together. Therefore, the conflicting changes must be resolved. In the spreadsheets of FIGS. 5*b* and 5*c*, it should be understood that the following conflicts exist:

|      | Changes |            |
| ---- | ------- | ---------- |
| Cell | User 1  | User 2     |
| A1   | "12"    | Delete Row 1 |
| B2   | "20"    | "25"       |

If it is determined at step 250 that a conflict exists, the method follows "yes" branch 251 to step 260. At step 260, it is determined whether a dialog box is to be displayed to the user that allows the user to resolve the conflict by selecting which of the conflicting actions wins the conflict. If the dialog box is displayed to the user on the monitor, the method follows "yes" branch 261 to step 270 where the user selects the winning action. The method then proceeds to step 290. If the dialog box is not displayed to the user, the method follows "no" branch 262 to step 280, where the most recently occurring action is declared the winner of the conflict. For the purposes of this example, assume that the dialog box is displayed that allows user 1 to select the winning action. In this example, user 1 has selected the winning action of the conflict in cell A1 to be "12". Because "12" is user 1's change, it should be understood that the winning action is located in the user 1's memory change log (FIG. 7*a*) and the losing action ("Delete Row 1") is located in the disk change log (FIG. 7*c*). Conversely, user 1 has selected the winning action of the conflict in cell B2 to be "25". It should be understood that the winning action of the conflict in cell B2 is located in the disk change log and the losing action is located in the memory change log. The method then proceeds to step 290.

At step 290, it is determined whether the losing action was a change that was stored in the memory change log. If so, as is the case with the losing action in the conflict in cell B2, the method follows "yes" branch 291 to step 300 where the inverse action is applied to the memory image. An inverse action for a prior action is an action that, if performed on the spreadsheet, will produce the same result as if the prior action had never occurred. For example, the inverse action for a "delete row" action is an "insert row" action.

At step 305, the losing action is deleted from the memory change log. The reference-adjusted memory change log omitting the deleted losing action is shown in FIG. 7*f*. The method then proceeds to step 330.

If it is determined at step 290 that the losing action is not in the memory change log, i.e., the losing action is located in the disk change log, the method follows "yes" branch 292 to step 320. At step 320, an inverse action of the losing action is created and is stored in a "disk undo log". The disk undo log stores inverse actions of losing disk change log entries such that when the disk undo log is appended to the disk change log, the inverse action in the disk undo log is combined with the losing action to effectively eliminate the losing action from the disk change log. Because the losing action in the conflict in cell A1 is the "Delete Row 1" action located in the disk change log shown in FIG. 7*d*, the inverse action "Insert Row 1" is created and stored in the disk undo log, shown in FIG. 7*e*. The inverse action "Insert Row 1" includes inserting a row of cells at the appropriate location of the deleted row of cells, restoring all data in the cells that were in the deleted row, and restoring all references to cells in the inserted row. The method then proceeds to step 330.

At step 330, it is determined if an additional conflict exists between the reference-adjusted memory change log and the reference-adjusted disk change log. If another conflict exists, the method follows "yes" branch 331 and returns to step 260. If no additional conflicts exist, the method follows "no" branch 332 and proceeds to step 340.

At step 340, the changes in the reference-adjusted memory change log, shown in FIG. 7*f*, are applied to the memory image. At step 350, the memory image is saved to the disk file where the memory image overwrites the disk image. At step 360, the disk undo log and the reference-adjusted memory change log are saved to the disk file. Therefore, when a user makes changes to a spreadsheet and performs a save operation to the disk file, the disk file that contains the previously-existing disk change log is appended with the disk undo log followed by the user's reference-adjusted memory change log. Subsequently, when the contents of the new disk change log are read sequentially, any losing actions in the previously-existing disk change log that conflict with changes in the memory change log are followed by the corresponding undo actions in the disk undo log before the winning action in the memory change log is read. This prevents a losing action in the disk change log from being followed by the corresponding winning action in the memory change log without an intervening undo action. Thus, the changes made to the spreadsheet by the user are appended to the disk change log and any losing actions in the disk log are eliminated by the inverse actions stored in the disk undo log. The method then terminates at 400.

Figure 5D:
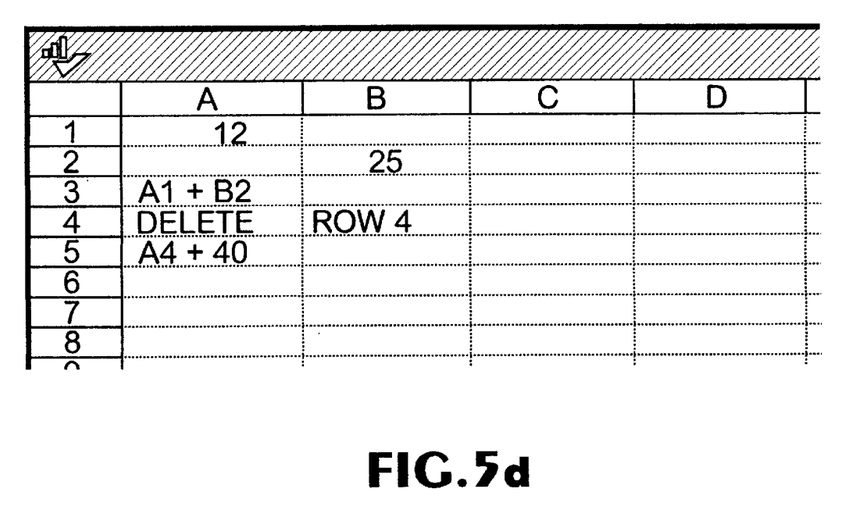

If at step 250, it is determined that no conflicts exist between the reference-adjusted memory change log and the reference-adjusted disk change log, the method follows "no" branch 252 to step 380. At step 380, the memory image is stored to the disk file where it overwrites the disk image. It should be understood that changes made to the spreadsheet are automatically applied to memory image as the changes are made by the user. Thus, the new disk image includes the newly changed spreadsheet. The spreadsheet image including the merged changes of user 1 and user 2 is shown in FIG. 5*d*. It should be understood that the "Delete Row 4" entry in row 4, as seen in FIG. 5*d*, is included merely for the purposes of illustration. The actual spreadsheet would include the contents of cell A5 that would be moved upward into cell A4. The contents of cell A5 would be reference-adjusted to a value "#REF!", because the cell to which cell A5 refers was located in a row of cells that was deleted. At step 390, the changes in the reference-adjusted memory change log are appended to the disk change log in the disk file. The method then terminates at 400.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. In association with a computer system, a method for simultaneously editing a spreadsheet stored in a disk file of a computer, said disk file including a disk image of said spreadsheet and a disk change log for maintaining a list of changes to said spreadsheet stored in the disk file, comprising the steps of:

(a) allowing a first user using a first computer to access and edit said spreadsheet to create a first memory image of said spreadsheet;

(b) storing said first user's changes in a first memory change log;

(c) in response to performing a save operation, copying said first memory change log to said disk change log stored in said disk file;

(d) allowing second user using a second computer to access and edit said spreadsheet simultaneously with said first user to create a second memory image of said spreadsheet;

(e) storing said second user's changes in a second memory change log; and (f) in response to performing a save operation, identifying whether any intervening changes from said first user exist in said disk file, merging the changes in said second memory change log with said intervening changes, and coping said second memory change log to said disk change log.

2. The method of claim 1 wherein said step of merging comprises:

determining whether any conflicting changes exist between the changes in said second memory change log and said intervening changes of said first user;

resolving all conflicting changes by identifying and eliminating a losing change for each said conflicting change.

3. The method of claim 2 wherein said step of determining whether any conflicting changes exist comprises:

copying the portion of said disk change log containing said first user's changes to the memory of said second computer;

reference adjusting each change in said second memory change log according to each change in said disk change log;

reference adjusting each change in said disk change log according to each change in said second memory change log; and determining whether any two changes in said second memory change log and said disk change log cannot exist simultaneously.

4. The method of claim 2 wherein said step of resolving comprises displaying a dialog box on a display screen of said second computer identifying the conflicting changes and allowing said second user to select the losing change.

5. The method of claim 2 wherein said step of resolving comprises said second computer automatically selecting the change that occurred first in time as the losing change.

6. The method of claim 2 wherein if said losing change is located in said second memory change log:

generating an inverse change associated with the losing change;

applying said inverse change to said second memory image; and removing said losing change from said second memory change log.

7. Then method of claim 6 further comprising overwriting said disk image with said second memory image.

8. The method of claim 2 wherein if said losing change is located in said disk change log:

generating an inverse change associated with said losing change; and storing said inverse change in a disk undo log.

9. The method of claim 8 further comprising copying said disk undo log to said disk file.

10. A computer system, including a program module for allowing simultaneous editing of a spreadsheet stored in a disk file that is accessible by a first computer through a first network connection and a second computer through a second network connection, said disk file including a disk image of said spreadsheet and a disk change log for maintaining a list of changes to said spreadsheet stored in the disk file, said first computer being operative to:

(a) allow a first user using said first computer to access and edit said spreadsheet over said first network connection to create a first memory image of said spreadsheet and to equate a first session identifier to a current session identifier;

(b) store said first user's changes in a first memory change log;

(c) in response to said first user performing a save operation, copy over said first network connection, said first memory change log to said disk change log stored in said disk file and update said current session identifier; and said second computer being operative to:

(d) allow a second user using said second computer to access and edit said spreadsheet over said second network connection, simultaneously with said first user to create a second memory image of said spreadsheet and to equate a second session identifier to said current session identifier;

(e) store said second user's changes in a second memory change log;

(f) in response to said second user performing a save operation, identify over said second network connection whether any intervening changes from said first user exist in said disk file by comparing said second session identifier to said current session identifier;

(g) if any intervening changes exist, merge the changes in said second memory change log with said intervening changes;

(h) copy over said second network connection, said second memory change log to said disk change log; and (i) update said current session identifier.

11. The system of claim 10 wherein the existence of an intervening change is determined by determining whether said first user has performed a save operation since said second user accessed said spreadsheet.

12. The system of claim 10 wherein said second computer is operative to merge the changes by:

determining whether any conflicting changes exist between the changes in said second memory change log and said intervening changes of said first user; and resolving all conflicting changes by identifying a losing change for each said conflicting change.

13. The system of claim 12 wherein said second computer is operative to determine whether any conflicting changes exist by:

copying the portion of said disk change log containing said first user's changes to the memory of said second computer;

reference adjusting each change in said second memory change log according to each change in said disk change log;

reference adjusting each change in said disk change log according to each change in said second memory change log; and determining whether any two changes in said second memory change log and said disk change log cannot exist simultaneously.

14. The system of claim 12 wherein said second computer is further operative to identify a losing change by displaying a dialog box on a display screen of said second computer identifying the conflicting changes and allowing said second user to select the losing change.

15. The system of claim 12 wherein said second computer is further operative to identify a losing change by said second computer automatically selecting the change that occurred first in time as the losing change.

16. The system of claim 12 wherein if said losing change is located in said second memory change log, said second computer is operative to merge the changes by:

generating an inverse change associated with the losing change;

apply said inverse change to said second memory image; and removing said losing change from said second memory change log.

17. The system of claim 16, wherein said second computer is further operative to overwrite said disk image with said second memory image.

18. The system of claim 12 wherein if said losing change is located in said disk change log, said second computer is operative to merge the changes by:

generating an inverse change associated with said losing change; and storing said inverse change in a disk undo log.

19. The system of claim 18, wherein said second computer is further operative to copy said disk undo log to said disk file.

20. A memory storage device for a computer program, said memory storage device storing a computer program that provides a method for simultaneously editing a spreadsheet stored in a disk file of a computer, said disk file including a disk image of said spreadsheet and a disk change log for maintaining a list of changes to said spreadsheet stored in the disk file, said method comprising the steps of:

(a) allowing a first user using a first computer, said first computer being functionally connected to said computer by a first network connection, to access and edit said spreadsheet over said first network connection to create a first memory image of said spreadsheet;

(b) storing said first user's changes in a first memory change log;

(c) in response to performing a save operation, copying over said first network connection, said first memory change log to said disk change log stored in said disk file;

(d) allowing a second user using a second computer, said second computer being functionally connected to said computer by a second network connection, to access and edit said spreadsheet over said first network connection, simultaneously with said first user to create a second memory image of said spreedsheet;

(e) storing said second user's changes in a second memory change log; and (f) in response performing a save operation, identifying, over said first network connection, whether any intervening changes from said first user exist in said disk file, merging the changes in said second memory change log with said intervening changes and storing said merged changes in said second memory change log, and copying said second memory change log over said first network connection to said disk change log.

21. The memory storage device of claim 20 wherein said step of merging comprises:

determining whether any conflicting changes exist between the changes in said second memory change log and said intervening changes of said first user;

resolving all conflicting changes by identifying a losing change for each said conflicting change.

22. The memory storage device of claim 21 wherein said step of determining whether any conflicting changes exist comprises:

copying the portion of said disk change log containing said first user's changes to the memory of said second computer;

reference adjusting each change in said second memory change log according to each change in said disk change log;

reference adjusting each change in said disk change log according to each change in said second memory change log; and determining whether any two changes in said second memory change log and said disk change log cannot exist simultaneously.

23. The memory storage device of claim 21 wherein said step of resolving comprises displaying a dialog box on a display screen of said second computer identifying the conflicting changes and allowing said second user to select the losing change.

24. The memory storage device of claim 21 wherein said step of resolving comprises said second computer automatically selecting the change that occurred first in time as the losing change.

25. The memory storage device of claim 21 wherein if said losing change is located in said second memory change log:

generating an inverse change associated with the losing change;

applying said inverse change to said second memory image; and removing said losing change from said second memory change log.

26. Then memory storage device of claim 25 further comprising overwriting said disk image with said second memory image.

27. The memory storage device of claim 21 wherein if said losing change is located in said disk change log:

generating an inverse change associated with said losing change; and storing said inverse change in a disk undo log.

28. The memory storage device of claim 27 further comprising copying said disk undo log to said disk file.

* * * * *